United States Patent Office 3,294,768
Patented Dec. 27, 1966

3,294,768
PREPARATION OF CONJUGATED DIENE
POLYMERS
Clinton F. Wofford, Bartlesville, Okla., assignor to Phillips
Petroleum Company, a corporation of Delaware
No Drawing. Filed Nov. 14, 1963, Ser. No. 323,567
15 Claims. (Cl. 260—83.7)

This invention relates to the preparation of conjugated diene polymers, including homopolymers and copolymers of conjugated dienes as well as copolymers of conjugated dienes with other unsaturated compounds. In one aspect, it relates to the preparation of completely random copolymers having a low vinyl content. In another aspect, it relates to a process for preparing novel random copolymers of certain conjugated dienes and vinyl-substituted aromatic hydrocarbons. In a further aspect, it relates to a novel catalyst system for use in preparing conjugated diene polymers.

It is known that organolithium compounds can be utilized as catalysts for the polymerization of conjugated dienes, either alone or with copolymerizable monomers such as vinyl-substituted aromatic hydrocarbons. One type of product that has recently attracted considerable attention is a block copolymer that is prepared in the presence of organolithium catalysts. In one method for its preparation, a mixture of a conjugated diene and a vinyl-substituted aromatic hydrocarbon is contacted with an organo-lithium compound in the presence of a hydrocarbon diluent. While such block copolymers have many useful applications, it is often desirable for certain uses to obtain polymers of the random type. One method that has been proposed for the production of such random copolymers involves the incorporation of lesser or greater amounts of a polar solvent, such as an ether, in the hydrocarbon diluent used in the block copolymer process. When conducting the process in the presence of a polar solvent, the polymer obtained is a random copolymer characterized by the presence of numerous vinyl groups in the molecular configuration, frequently as high as 70 percent or more of those theoretically possible. Such random copolymer products have many important applications in the polymer field, but it is often desirable in many applications, e.g., in the fabrication of tires, to provide polymers having a low vinyl content.

One of the objects of this invention is, therefore, to provide a novel process for preparing completely random copolymers having a low vinyl content.

Another object of the invention is to provide a process for preparing completely random copolymers of certain conjugated dienes and vinyl-substituted aromatic hydrocarbons.

A further object of the invention is to provide a process for controlling the vinyl content of conjugated diene homopolymers as well as the vinyl content of the conjugated diene portion of random copolymers.

A still further object of the invention is to provide a novel catalyst system for use in the preparation of conjugated diene polymers.

Other and further objects and advantages of the invention will become apparent to those skilled in the art upon consideration of the following disclosure.

The present invention resides in the discovery of a novel catalyst system for use in a process for preparing conjugated diene polymers. The catalyst can be employed in the polymerization of conjugated dienes alone or in admixture with vinyl-substituted aromatic hydrocarbons. Broadly speaking, the polymerization process of this invention comprises the step of contacting in a polymerization zone a conjugated diene, either alone or in admixture with another conjugated diene or a vinyl-substituted aromatic hydrocarbon, with a catalyst which forms on mixing components comprising (1) an organolithium compound and (2) an organic compound of sodium, potassium, rubidium or cesium. When proceeding in accordance with this process, random copolymers can be obtained that have a much lower vinyl content than when a polar compound, such as an ether, is employed as a randomizing agent. Also, by regulating the amount of the components used in preparing the catalyst, it is possible to control the polymer structure (vinyl content) of conjugated diene homopolymers, as well as the conjugated diene portion of random copolymers.

Organolithium compounds employed in preparing the catalyst of this invention correspond to the formula $R(Li)_x$ wherein R is a hydrocarbon radical selected from the group consisting of aliphatic, cycloaliphatic and aromatic radicals, and $x$ is an integer from 1 to 4, inclusive. The R in the formula preferably contains from 1 to 20 carbon atoms, although it is within the scope of the invention to use higher molecular weight compounds. Examples of organolithium compounds which can be used include methyllithium, isopropyllithium n-butyllithium, sec-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,2-dilithio-1,2-diphenylethane, 1,2 - dilithio-1,8-diphenyloctane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

As mentioned above, the other component employed in preparing the present catalyst is an organic compound of sodium, potassium, rubidium or cesium. These compounds are selected from the group consisting of compounds having the following formulas:

(1)                R'M
(2)               R'(YM)$_n$ (3)

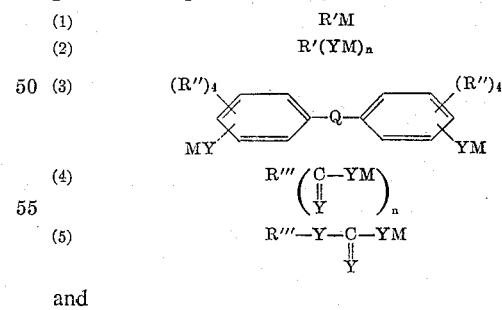

(4)          $R'''\left(\begin{matrix}C-YM\\\|\\Y\end{matrix}\right)_n$ (5)          $R'''-Y-C-YM$
                                  $\|$
                                  Y and

wherein R' is selected from the group consisting of aliphatic, cycloaliphatic and aromatic radicals, preferably containing from 1 to 20 carbon atoms, M is an alkali metal selected from the group consisting of sodium, potassium, rubidium and cesium, R'' is selected from the group consisting of hydrogen and aliphatic, cycloaliphatic and aromatic radicals, preferably containing from 1 to 6 carbon atoms, Q is selected from the group consisting of

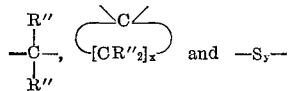

radicals, where R'' is as defined before, $x$ is an integer from 4 to 5, inclusive, and $y$ is an integer from 1 to 3, inclusive, R''' is selected from the group consisting of aliphatic, cycloaliphatic and aromatic radicals, preferably containing from 4 to 20 carbon atoms, Y is selected from the group consisting of oxygen and sulfur and $n$ is an integer from 1 to 3, inclusive. It is to be understood that the aliphatic and cycloaliphatic radicals mentioned above can be saturated or unsaturated.

Examples of organometal compounds corresponding to Formula 1 include the following: methylsodium, ethylpotassium, n-propylrubidium, isopropylcesium, tert-butylsodium, tert-amylsodium, n-hexylpotassium, cyclohexylrubidium, eicosylcesium, 4-methylcyclohexylsodium, 3-hexenylsodium, 2,5-decadienylpotassium, 3-cyclopentenylrubidium, 4,6-di-n-butyldecylsodium, 3,6-diphenyloctylpotassium, phenylsodium, 1-naphthyloptassium, 4-toylpotassium, benzylsodium, 4-tert-butyl-6,7-diisopropyl-2-naphthylpotassium, and the like.

Formulas 2 and 3 define the alkali metal salts of mono- and polyhydric alcohols, mono- and polyhydric phenols, including bis-phenols, and sulfur analogs of the foregoing, that can be used in preparing the present catalyst system. Specific examples of compounds represented by Formula 2 include the sodium, potassium, rubidium and cesium salts of methyl alcohol, ethyl alcohol, n-propyl alcohol, isopropyl alcohol, tert-butyl alcohol, tert-amyl alcohol, n-hexyl alcohol, cyclohexyl alcohol, eicosyl alcohol, 2-butenyl alcohol, 4-methylcyclohexyl alcohol, 3-hexenyl alcohol, 2,5-decadienyl alcohol, 3-cyclopentenyl alcohol, 4,6-di-n-butyldecyl alcohol, 4,8-dodecadienyl alcohol, allyl alcohol, 1,3-dihydroxyhexane, 1,5,9-trihydroxytridecane, 1,6-dihydroxyoctane, 1,9,15-trihydroxypentadecane, benzyl alcohol, 3(4-toyl)propyl alcohol, phenol, catechol, resorcinol, hydroquinone, pyrogallol, 1-naphthol, 2-naphthol, 2,6-di-tert-butyl-4-methylphenol (Ionol), 2,4,6-tri-tert-butylphenol, 2,6-di-tert-butyl-4-phenylphenol, 2,6-di-sec-butyl-4-methylphenol, ethanethiol, 1-butanethiol, 2-pentanethiol, 2-isobutanethiol, benzenethiol (thiophenol), 1,12-dodecanedithiol, 5,9-di-n-propyl-1,14-tetradecanedithiol, 2-naphthalenethiol, cyclohexanethiol, 2,5-di-n-hexyl-6-tert-butylbenzenethiol, 2,6-di-tert-butyl-4(4-toyl)benzenethiol, 3-methylcyclohexanethiol, 2-naphthalenehiol, benzenemethanethiol, 2-naphthalenemethanethiol, 1,8-octanedithiol, 1,10-decanedithiol, 1,4-benzenedithiol, and the like. Specific examples of suitable compounds corresponding to Formula 3 are the sodium, potassium, rubidium and cesium salts of 2,2'-methylene-bis(4-methyl-6-tert-butylphenol),
2,2'-isopropylidene-bis(6-cyclohexyl-p-cresol),
4,4'-isopropylidene-bis(2,6-dicyclohexylphenol),
4,4'methylene-bis(2,6-diisopropylphenol),
2,2'-methylene-bis(6-benzyl-p-cresol),
2,2'-ethylidene-bis(5-isopropylphenol),
1,1-bis(4-hydroxyphenyl)cyclohexane,
1,1-bis[2-hydroxy-3-(3-tolyl)]cyclopentane,
2,2'-ethylidene-bis(4-ethyl-6-tert-hexylthiophenol),
2,2'-propylidene-bis(3,5-dimethyl-6-cyclopenthylthiophenol),
4,4'-thio-bis(2,6-di-tert-butylphenol),
4,4'-dithio-bis(2-n-propyl-6-tert-butylphenol),
4,4'-trithio-bis(2-methyl-6-isopropylphenol),
and the like.

Specific examples of the alkali metal salts of mono- and polycarboxy acids and sulfur analogs as represented by Formula 4 include the sodium, potassium, rubidium and cesium salts of isovaleric acid, caprylic acid, lauric acid, myristic acid, palmitic acid, stearic acid, arachidic acid, oleic acid, ricinoleic acid, linoleic acid, linolenic acid, gadoleic acid, cyclopentanecarboxylic acid, dimethylcyclohexane-3,5-dicarboxylic acid, phenylacetic acid, benzoic acid, pimelic acid, azelaic acid, sebacic acid, phthalic acid, hendecane-1,11-dioic acid, 1,8,16-hexadecanetricarboxylic acid, 3,3,7,7-tetramethylnonane-1,5,9-tricarboxylic acid, 4-pentyl-2,5-heptadiene-1,7-dioic acid, 2-naphthoic acid, 1-naphthaleneacrylic acid, hexanethionic acid, 2,2-diethylbutanethiolic acid, decanethionic acid, tridecanethionothiolic acid, 4-tetradecanethionic acid, thiolbenzoic acid, thiono-1-naphthoic acid, and the like.

Specific examples of alkali metal carbonates and sulfur analogs as represented by Formula 5 include the sodium, potassium, rubidium and cesium salts of tert-butylcarbonic acid, n-hexylcarbonic acid, 3,5-dimethylhexylcarbonic acid, n-dodecylcarbonic acid, 4,4-diethylhexylcarbonic acid, 3,6-diphenyloctylcarbonic acid, 7-dodecenylcarbonic acid, 3-cyclohexenylcarbonic acid, phenylcarbonic acid, O-tert-amyl ester of thiolcarbonic acid, O-tridecyl ester of thionocarbonic acid, O-eicosyl ester of thionothiocarbonic acid (xanthic acid), S-hexadecyl ester of dithiolcarbonic acid, S-(3-cyclohexenyl) ester of thiolcarbonic acid, phenyl ester of trithiocarbonic acid, and the like.

Specific examples of alkali metal salts of secondary amines as represented by Formula 6 include the sodium, potassium, rubidium and cesium salts of dimethylamine, di-n-butylamine, methyl-n-hexylamine, di(3,5-diethyloctyl)amine, di(8-phenyloctyl)amine, di(3-hexenyl)-amine, diphenylamine, dibenzylamine, ethyl-4-tolylamine, n-propyl-n-eicosylamine, and the like.

It is to be understood that any one or more of the organic compounds of sodium, potassium, rubidium and cesium as represented by the formulas can be used with one or more of the $R(Li)_x$ compounds in forming the present catalyst system. Alkali metal derivatives of compounds having mixed functionality can also be employed with the $R(Li)_x$ compounds. Examples of such derivatives include the sodium, potassium, rubidium and cesium salts of 10-hydroxydecanoic acid, 8-mercapto-1-naphthoic acid, 1-hydroxy-14-mercapto-8-tetradecene, 1-hydroxy-9-mercaptopentdecanoic acid, 2-tert-butyl-6-mercapto-1-naphthoic acid, and the like.

The amount of the organolithium compound employed in forming the catalyst system can vary over a wide range. It will generally be in the range of 0.3 to 100 milliequivalents of organolithium compound per 100 parts by weight of total monomers charged with from 0.6 to 15 milliequivalents of organolithium compound per 100 parts of total monomers being preferred. The relative quantities of organolithium compounds and the organic compounds of sodium, potassium, rubidium and cesium can also vary over a rather broad range. The amount of the organolithium compound will generally be in the range of 0.25 to 25 equivalents (based on lithium atoms) per equivalent of the organic compound of sodium, potassium, rubidium or cesium. Only a small amount of the compound of sodium, potassium, rubidium or cesium is required to produce a completely random copolymer of a conjugated diene and a vinyl-substituted aromatic hydrocarbon. When an ether, such as diethyl ether or tetrahydrofuran is utilized as a randomizing agent to produce a random copolymer, larger amounts are generally necessary to obtain the desired effect.

Monomers that are polymerized in accordance with the present process are selected from the group consisting of (1) at least one conjugated diene and (2) a mixture of conjugated dienes and vinyl-substituted aromatic hydrocarbons. Conjugated dienes that can be used preferably contain from 4 to 12 carbon atoms per molecule and include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. The vinyl-substituted aromatic hydrocarbons that can be employed include any vinyl-substituted aromatic hydrocarbon in which the vinyl group is attached to a nuclear carbon atom. It is to be understood that a compound having a substituent on the alpha carbon atom, such as alpha-methylstyrene, is not applicable to the practice of the instant invention. Examples of vinyl-substituted aromatic hydrocarbons which are often preferred are styrene, 1-vinylnaphthalene and 3-methylstyrene (3-vinyltoluene). Examples of other compounds which can be advantageously utilized include 3,5-diethylstyrene, 4-n-propylstyrene, 2,4,6-trimethylstyrene, 4-dodecylstyrene, 3-methyl-5-n-hexylstyrene, 4-phenylstyrene, 2-ethyl-4-benzylstyrene, 4-p-tolylstyrene, 3,5-diphenylstyrene, 2,3,4,5-tetraethylstyrene, 3-(4-n-hexylphenyl)styrene, 3-ethyl-1-vinylnaphthalene, 6-isopropyl-1-vinylnaphthalene, 3,6-di-p-tolyl-1-vinylnaphthalene, 6-cyclohexyl-1-vinylnaphthalene, 8-phenyl-1-vinylnaphthalene, 7-dodecyl-2-vinylnaphthalene, and the like.

The process of this invention is particularly concerned with the preparation of rubbery homopolymers and copolymers of conjugated dienes. By varying the amount of the compound of sodium, potassium, rubidium or cesium employed in forming the catalyst, it is possible to regulate the structure (vinyl content) of the polymer product. The process is especially applicable to the production of completely random copolymers, i.e., they do not contain a polymer block of the vinyl-substituted aromatic. These random copolymers of a conjugated diene and a vinyl-substituted aromatic hydrocarbon have a low vinyl content, often being less than 10 percent. When the random copolymers are prepared from butadiene and styrene, the vinyl content is generally in the range of 5 to 15 percent and is often less than 10 percent. In the case of isoprene/styrene copolymers, the products usually have a vinyl content (predominantly 3,4-addition) in the range of 5 to 20 percent. The rubbery homopolymer as well as the random copolymer products are usually gel-free and have excellent physical properties, which render them particularly suitable for use in the fabrication of automobile and truck tires However, by varying the amount of catalyst employed in the polymerization process liquid polymers can also be prepared.

The amount of conjugated diene and vinyl-substituted aromatic hydrocarbon employed in the preparation of the completely random copolymers can vary over a rather wide range, e.g., from 5 to 95 parts by weight of conjugated diene and from 95 to 5 parts by weight of vinyl-substituted aromatic hydrocarbon, both based on 100 parts by weight of total monomers. In preparing rubbery random copolymers, it is usually preferred to employ from 95 to 50 parts by weight of conjugated diene and from 5 to 50 parts by weight of vinyl-substituted aromatic hydrocarbons. It is to be understood that mixtures of conjugated dienes as well as mixtures of the vinyl-substituted aromatic hydrocarbons can be utilized in preparing the random copolymers.

The polymerization process of this invention can be carried out at any temperature within the range of about −80 to 150° C., but it is preferred to operate in the range of −20 to 80° C. The polymerization reaction can be carried out under autogenous pressures. It is usually desirable to operate at pressure sufficient to maintain the monomeric materials substantially in the liquid phase. The pressure will thus depend upon the particular materials being polymerized, the diluent employed, and the temperature at which the polymerization is carried out. However, higher pressures can be employed, if desired, these pressures being obtained by some such suitable method as the pressurization of the reactor with a gas which is inert with respect to the polymerization reaction.

The process of this invention is usually carried out in the presence of a hydrocarbon diluent selected from the group consisting of aromatic, paraffinic and cycloparaffinic hydrocarbons. The preferred hydrocarbons of these types are paraffins and cycloparaffins containing from 3 to 12, inclusive, carbon atoms per molecule. Examples of suitable diluents include propane, isobutane, n-pentane, isooctane, n-dodecane, cyclopentane, cyclohexane, methylcyclohexane, benzene, toluene, xylene, ethylbenzene, and the like. It is to be understood that mixtures of two or more of these hydrocarbon diluents can also be used. The amount of diluent employed in the process is usually in the range of 200 to 2,000 parts by weight per 100 parts by weight of total monomers with 300 to 1500 parts being a preferred range.

The process of this invention can be carried out as a batch process by utilizing any suitable charging procedure, e.g., by charging the monomeric material into a reactor containing the catalyst and the diluent. In another method, the two catalyst components are charged separately to the reactor, either prior to or subsequent to the addition of the monomeric material and/or the diluent. It is also within the scope of the invention to preform the catalyst by mixing the two catalyst components in a liquid hydrocarbon, preferably the same as the polymerization diluent. It is also frequently advantageous to age the catalyst, particularly when the second component, i.e., the sodium, potassium, rubidium or cesium compound is not readily soluble in the liquid hydrocarbon. In such cases, optimum results are obtained by aging the mixture at a temperature in the range of about 25° C. to 150° C. The aging time depends upon the temperature used and the solubility of the second catalyst component, but it is usually in the range of about 5 minutes to about 8 minutes. In many instances, the aging time is in the range of 1 to 100 hours, but times as long as 6 to 8 months can be utilized. The process can also be practiced in a continuous manner by maintaining the above-described concentrations of reactants in the reactor for a suitable residence time. The residence time in the continuous process will, of course, vary within rather wide limits depending upon such variables as reaction temperature, pressure, the amount of catalyst used and the monomeric materials being polymerized. In a continuous process the residence time generally falls within the range of 1 second to 1 hour when conditions within the specified ranges are employed. When a batch process is being utilized, the time for the raction can be as high as 24 hours or more although it is generally less than 24 hours.

Upon completion of the polymerization period, the reaction mixture is treated in order to inactivate the catalyst and recover the polymer. It is generally preferred to add only an amount of a catalyst deactivating material, such as water or an alcohol, which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst deactivating agent and the antioxidant, the polymer present in the solution can then be precipitated by the addition of an excess of a material such as ethyl alcohol or isopropyl alcohol. It is to be understood, however, that deactivation of the catalyst and precipitation of the polymer can be accomplished in a single step. The precipitated polymer can then be recovered by filtration, decantation, and the like. In order to purify the polymer, the separated polymer can be dedissolved in a suitable solvent and again precipitated by addition of an alcohol. Thereafter, the polymer is again recovered by separation steps, as indicated hereinbefore, and dried. Any suitable hydrocarbon solvent, such as mentioned hereinbefore, can be used in this purification step to redissolve the polymer. The diluent and alcohol can be separated, for example, by fractional distillation, and reused in the process.

As mentioned before, it is within the scope of the invention to utilize an antioxidant. The antioxidant can be added to the reaction mixture prior to precipitation of the polymer, to the solution of redissolved polymer or to the diluent in which the polymer is to be subsequently dissolved.

The rubbery polymers produced in accordance with this invention have utility in applications where synthetic and natural rubbers are used. The polymers can be compounded by any of the known methods as have been used in the past for compounding rubbers. Compounding ingredients, such as fillers, dyes, pigments, curing or cross-linking agents, softeners, reinforcing agents, and the like, can be used in the compounding operation. In manufacturing finished articles, the rubbery polymers can be molded or extruded. They can be advantageously employed in the manufacture of items such as automobile tires, gaskets, containers, pipes, and the like.

A more comprehensive understanding of the invention can be obtained by referring to the following illustrative examples which are not intended, however, to be unduly limitative of the invention.

*Example I*

A series of runs was conducted in which 1,3-butadiene and styrene were copolymerized in the presence of a catalyst formed by mixing variable quantities of n-butyllithium and potassium tert-butoxide (the potassium salt of butyl alcohol). A control run was also conducted in which n-butyllithium was employed as the catalyst and tetrahydrofuran was used as a randomizing agent. The polymerization recipes, reaction conditions and physical properties of the products are summarized hereinafter in Table I. The procedures used in the several runs shown in Table I are described hereinafter.

In Runs 1, 2, 3 and 5, the catalyst was preformed by adding a butyllithium solution to potassium tert-butoxide in cyclohexane. The mixture was used immediately after its preparation. In preforming the catalyst used in Run 4, the components were mixed after which they were placed in a deep freeze overnight. The catalyst was warmed to room temperature and allowed to stand for a short time prior to charging. In Runs 6 and 7, the catalyst was preformed by mixing the ingredients in the presence of cyclohexane. The resulting mixture was placed in a 122° F. bath and agitated until dissolved. In each of the runs the diluent cyclohexane was charged first, followed by the monomers and then the preformed catalyst.

In control Run 8, cyclohexane was charged first. The monomers were then added, followed by the butyllithium and the tetrahydrofuran.

The polymerizations were all terminated with a solution of 2,2'-methylene-bis(4-methyl-6-tert-butylphenol) in a 50/50 volume mixture of toluene and isopropyl alcohol, using an amount sufficient to provide 1 part by weight of the antioxidant per 100 parts by weight of rubber. In Runs 1, 2, 3, 5, 6 and 7, the polymers were coagulated in isopropyl alcohol, separated and dried. In Runs 4 and 8, the polymers were recovered by stripping off the the diluent.

All reactions were carried out in an atmosphere of nitrogen. In addition to being used in the catalyst system, butyllithium also served as a scavenger of catalyst-inactivating materials. Based on prior experience, the scavenger level was estimated as indicated in Table I. The amount varied with the size of the charge.

TABLE I

| | 1 | 2 | 3 | 4 | 5 | 6 | 7 | 8 |
|---|---|---|---|---|---|---|---|---|
| 1,3-butadiene, parts by weight | 75 | 75 | 75 | 75 | 75 | 75 | 75 | 75 |
| Styrene, parts by weight | 25 | 25 | 25 | 25 | 25 | 25 | 25 | 25 |
| Cyclohexane, parts by weight | 780 | 780 | 780 | 780 | 780 | 780 | 780 | 780 |
| n-Butyllithium, mmoles | 0.6 | 0.6 | 1.2 | 1.4 | 1.0 | 0.9 | 0.8 | 1.8 |
| Potassium tert-butoxide, mmoles | 0.12 | 0.042 | 0.093 | 0.1 | 0.05 | 0.04 | 0.03 | [3] 6.9 |
| Assumed scavenger (BuLi)[1], mmoles | 0.5 | 0.5 | 0.5 | 0.5 | 0.5 | 0.5 | 0.5 | 1.0 |
| Effective BuLi levels, mmoles | 0.1 | 0.1 | 0.7 | 0.9 | 0.5 | 0.4 | 0.3 | 0.8 |
| Effective BuLi/KO-t-Bu[2], mmole ratio | 0.8/1 | 2.4/1 | 7.5/1 | 9/1 | 10/1 | 10/1 | 10/1 | [4] 0.116/1 |
| Temperature, °F | 122 | 122 | 122 | 122 | 122 | 122 | 122 | 122 |
| Time, hours | 4.5 | 22 | 22 | 3.83 | 4.5 | 16 | 16 | 3 |
| Conversion, percent | | | | 99.4 | | | | 97 |
| Inherent viscosity [5] | 2.9 | 2.63 | 1.16 | 1.12 | 1.63 | 1.85 | 1.93 | 1.04 |
| Mooney, ML-4 at 212° F.[6] | >100 | | 15 | | 39.5 | 62 | 74 | |
| Polystyrene, wt. percent [7] | 0 | 0 | 0 | 0 | 0 | 0 | 0 | |
| Microstructure, percent: [8] | | | | | | | | |
| Raw values— | | | | | | | | |
| Trans | 36.0 | 38.1 | 38.6 | 37.4 | 37.3 | 38.1 | 37.9 | 37.6 |
| Vinyl | 9.6 | 6.9 | 7.6 | 10.9 | 9.4 | 7.4 | 6.8 | 21.1 |
| Normalized (based on 100% PBD): | | | | | | | | |
| Cis, by difference | 39.2 | 40.0 | 38.4 | 35.6 | 37.8 | 39.3 | 40.4 | 21.8 |
| Trans | 48.0 | 50.8 | 51.5 | 49.9 | 49.7 | 50.8 | 50.5 | 50.1 |
| Vinyl | 12.8 | 9.2 | 10.1 | 14.5 | 12.5 | 9.9 | 9.1 | 28.1 |

[1] BuLi=n-butyllithium.
[2] KO-t-Bu=potassium tert-butoxide.
[3] Tetrahydrofuran (THF) used as randomizing agent.
[4] BuLi/THF mole ratio.
[5] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer soultion to that of toluene. The inherent viscosity is calculated by dividing the natural logarithm of the relative viscosity by the weight of the soluble portion of the original sample.
[6] ASTM D1646-61, Mooney viscometer, large rotor, 212° F.
[7] Determined by oxidative degradation procedure. Approximately 0.5 gram of the polymer was cut into small pieces, weighed to within one milligram, and charged to a 125 ml. flask. Forty to fifty grams of a-dichlorobenzene was then charged to the flask and the contents were heated to 130° F. and maintained at this temperature until the polymer had dissolved. The mixture was cooled to 80 to 90° C., 8.4. ml. of a 71.3 percent by weight aqueous solution of tert-butyl hydroperoxide was added followed by 1 ml. of 0.003 molar osmium tetroxide in toluene. The mixture was heated to between 110 and 115° C. for 10 minutes, then cooled to between 50 and 60° C., 20 ml. of toluene was added, and the solution was poured slowly into 250 ml. of ethanol containing a few drops of concentrated sulfuric acid. This treatment causes any polystyrene present to coagulate, after which it can be recovered, dried, and weighed.
[8] Determined by infrared analysis.

Reference to Table I shows that the mole ratio of butyllithium to potassium tert-butoxide can be varied over a fairly wide range while still obtaining a completely random copolymer. This is evidenced by the absence of polystyrene. At butyllithium to potassium tert-butoxide mole ratios of 0.8/1 and higher, the vinyl content was much lower than in control Run 8 in which tetrahydrofuran was used as a randomizing agent.

Products from Runs 5, 6 and 7 were compounded, cured 30 minutes at 307° F, and physical properties determined. The data are summarized in Table II.

TABLE II

|  | 5 | 6 | 7 |
|---|---|---|---|
| Compounding Recipe, Parts by Weight: | | | |
| Rubber | 100 | 100 | 100 |
| High abrasion furnace black | 50 | 50 | 50 |
| Zinc oxide | 3 | 3 | 3 |
| Stearic acid | 2 | 2 | 2 |
| Flexamine [1] | 1 | 1 | 1 |
| Aromatic oil | 10 | 10 | 10 |
| Sulfur | 1.75 | 1.75 | 1.75 |
| Santocure [2] | 1.0 | 1.0 | 1.0 |
| Compounded Mooney, ML-4 at 212°F.[3] | 70 | 96.6 | 105.7 |
| Physical Properties, Cured 30 Minutes at 307° F.: | | | |
| 300% Modulus, p.s.i.[4] | 1,440 | 1,280 | 1,290 |
| Tensile, p.s.i.[4] | 3,170 | 3,520 | 3,650 |
| Elongation, percent [4] | 520 | 570 | 600 |
| Heat Build-up, ΔT, ° F.[5] | 55.5 | 52.7 | 51.6 |
| Resilience, percent [6] | 67.3 | 70.7 | 70.6 |
| Shore A hardness [7] | 63.5 | 64 | 62.5 |
| Gehman freeze point, ° C.[8] | −62 | −66 | −66 |

[1] Physical mixture containing 65 percent of a complex diarylamine-ketone reaction product and 35 percent of N,N′-diphenyl-p-phenylene-diamine.
[2] N-cyclohexyl-2-benzothiazolesulfenamide.
[3] ASTM D1646-61, Mooney Viscometer, large rotor, 212° F.
[4] ASTM 412-61T, Scott tensile machine L-6. Tests are made at 80° F.
[5] ASTM D623-58, method A, Goodrich flexometer, 143 lbs./sq. in. load, 0.175 inch stroke. Text specimen is a right circular cylinder 0.7 inch in diameter and 1 inch high.
[6] ASTM D945-59 (modified), Yerzley oscillograph. Test specimen is a right circular cylinder 0.7 inch in diameter and 1 inch high.
[7] ASTM D676-59T, Shore durometer, type A.
[8] ASTM D1053-61 (modified), Gehman torsional apparatus. Test specimen are 1.625 inches long, 0.125 inch wide and 0.077 inch thick. The angle of twist is measured at 5° C. intervals. Extrapolation to zero twist gives the freeze point.

The data in Table II show that all three vulcanizates had good physical properties.

Example II

Runs were made in which sodium, rubidium, cesium and lithium tert-butoxides (sodium, rubidium, cesium and lithium salts of butyl alcohol) were used in conjunction with butyllithium for the copolymerization of butadiene with styrene. Preformed catalysts were prepared from butyllithium and sodium, rubidium, and cesium tert-butoxides. The following recipe was employed:

| | |
|---|---|
| Metal tert-butoxide (MO-t-Bu), mmole | 1.0 |
| Cyclohexane, milliliters | 20 |
| n-Butyllithium, mmole | 0.6 |
| Assumed scavenger (BuLi), mmole | 0.1 |
| Effective BuLi/MO-t-Bu mole ratio | 0.5/1 |

Lithium tert-butoxide was charged directly to the polymerization system.

A series of runs was conducted in which each catalyst system was used. In those cases where the catalysts were preformed, a quantity of butyllithium above that in the preformed catalyst was added as required for variation of the BuLi/MO-t-Bu mole ratio. The polymerization recipe was as follows:

| | |
|---|---|
| 1,3-butadiene, parts by weight | 75 |
| Styrene, parts by weight | 25 |
| Cyclohexane, parts by weight | 780 |
| n-Butyllithium, total mmoles | 1.5 |
| Metal tert-butoxide | Variable |
| Assumed scavenger (BuLi), mmoles | 1.0 |
| Effective butyllithium level, mmoles | 0.5 |
| Effective BuLi/MO-t-Bu mole ratio | Variable |
| Temperature, ° F. | 122 |
| Time, hours | [1] 20 |

[1] Except in the case of BuLi/LiO-t-Bu where it was 19 hours.

Polymerizations were terminated with an isopropyl alcohol/toluene solution of 2,2′-methylene-bis(4-methyl-6-tert-butylphenol). The products were recovered by stripping off the diluent. The results of the runs are shown in Table III.

TABLE III

SODIUM TERT-BUTOXIDE

| Run No. | Initiator Charged | | Addnl. BuLi, mhm. | Total Effective BuLi, mhm. | Effective BuLi/MO-t-Bu, Mole Ratio | Conv., Percent | Inh.[2] Visc. | Polystyrene,[2] Wt. Percent |
|---|---|---|---|---|---|---|---|---|
| | MO-t-Bu, mhm.[1] | BuLi, mhm. | | | | | | |
| 1 | 1.0 | 0.50 | 1.0 | 1.25 | 0.5/1 | 99.3 | 1.84 | 0 |
| 2 | 0.5 | 0.25 | 1.25 | 1.25 | 1/1 | 98.7 | 1.76 | 0 |
| 3 | 0.25 | 0.13 | 1.37 | 1.37 | 2/1 | 98.3 | 1.38 | 4.4 |
| 4 | 0.1 | 0.05 | 1.45 | 1.45 | 5/1 | 97.6 | 1.35 | 8.8 |
| 5 | 0.05 | 0.03 | 1.47 | 1.47 | 10/1 | 100 | 1.47 | 14.3 |
| 6 | 0.02 | 0.01 | 1.49 | 1.49 | 25/1 | 98.8 | 1.40 | 20.4 |

RUBIDIUM TERT-BUTOXIDE

| Run No. | MO-t-Bu, mhm. | BuLi, mhm. | Addnl. BuLi, mhm. | Total Effective BuLi, mhm. | Effective BuLi/MO-t-Bu, Mole Ratio | Conv., Percent | Inh. Visc. | Polystyrene, Wt. Percent |
|---|---|---|---|---|---|---|---|---|
| 7 | 1.0 | 0.5 | 1.0 | 0.5 | 0.5/1 | 97.4 | 1.18 | 0 |
| 8 | 0.5 | 0.25 | 1.25 | 0.5 | 1/1 | 97.9 | 1.23 | 0 |
| 9 | 0.25 | 0.13 | 1.37 | 0.5 | 2/1 | 97.9 | 1.27 | 0 |
| 10 | 0.1 | 0.05 | 1.45 | 0.5 | 5/1 | 97.8 | 1.24 | 0 |
| 11 | 0.05 | 0.03 | 1.47 | 0.5 | 10/1 | 98.2 | 1.36 | 4.5 |
| 12 | 0.02 | 0.01 | 1.49 | 0.5 | 25/1 | 98.3 | 1.28 | 20.0 |

CESIUM TERT-BUTOXIDE

| Run No. | MO-t-Bu, mhm. | BuLi, mhm. | Addnl. BuLi, mhm. | Total Effective BuLi, mhm. | Effective BuLi/MO-t-Bu, Mole Ratio | Conv., Percent | Inh. Visc. | Polystyrene, Wt. Percent |
|---|---|---|---|---|---|---|---|---|
| 13 | 1.0 | 0.5 | 1.0 | 0.5 | 0.5/1 | 97.2 | 1.12 | 0 |
| 14 | 0.5 | 0.25 | 1.25 | 0.5 | 1/1 | 97.8 | 1.15 | 0 |
| 15 | 0.25 | 0.13 | 1.37 | 0.5 | 2/1 | 97.4 | 1.20 | 0 |
| 16 | 0.1 | 0.05 | 1.45 | 0.5 | 5/1 | 98.2 | 1.24 | 0 |
| 17 | 0.05 | 0.03 | 1.47 | 0.5 | 10/1 | 97.5 | 1.24 | 0 |
| 18 | 0.02 | 0.01 | 1.49 | 0.5 | 25/1 | 98.7 | 1.32 | 19.0 |

LITHIUM TERT-BUTOXIDE

| Run No. | MO-t-Bu, mhm. | BuLi, mhm. | Addnl. BuLi, mhm. | Total Effective BuLi, mhm. | Effective BuLi/MO-t-Bu, Mole Ratio | Conv., Percent | Inh. Visc. | Polystyrene, Wt. Percent |
|---|---|---|---|---|---|---|---|---|
| 19 | 1.0 | | | 0.5 | 0.5/1 | 100 | 1.32 | 17.1 |
| 20 | 0.5 | | | 0.5 | 1/1 | 100 | | |
| 21 | 0.1 | | | 0.5 | 5/1 | 100 | | |
| 22 | 0.05 | | | 0.5 | 10/1 | 100 | | |
| 23 | 0.025 | | | 0.5 | 20/1 | 100 | | |

[1] mhm. in the table equals millimoles per 100 parts monomers.
[2] See appropriate footnotes to Table I.

The foregoing data show that random copolymers with no detectable polystyrene can be prepared when using a catalyst formed from butyllithium and sodium, rubidium and cesium alkoxides. The butyllithium to metal alkoxide mole ratio used to produce the random copolymers is dependent upon the alkali metal alkoxide. When lithium tert-butoxide was used with butyllithium, completely random copolymers were not obtained. The first polymer of the series (Run 19) was analyzed for polystyrene and found to contain 17.1 percent. The appearance of the other polymers (Runs 20–23) of the series indicated that they also contained polystyrene blocks. These data also demonstrate that with the catalyst systems of this invention, an alkali metal other than lithium should be present in the compound that is used in conjunction with the organolithium compound.

*Example III*

Phenylsodium was employed in conjunction with butyllithium in forming a catalyst system for the random copolymerization of butadiene and styrene. The following recipe was used:

| | |
|---|---:|
| 1,3-butadiene, parts by weight | 75 |
| Styrene, parts by weight | 25 |
| Cyclohexane, parts by weight | 780 |
| n-Butyllithium, mmoles | 1.4 |
| Phenylsodium ($\phi$Na), mmoles | Variable |
| Assumed scavenger (BuLi), mmole | 1.0 |
| Effective BuLi level, mmole | 0.4 |
| Effective BuLi/$\phi$Na mole ratio | Variable |
| Temperature, °F. | 122 |
| Time, hours | 17 |

Three runs were carried out, using variable BuLi/$\phi$Na ratios. The results of the runs are presented in Table IV.

| | |
|---|---:|
| n-Butyllithium, mmoles | Variable |
| Potassium fatty acid soap, mmoles | Variable |
| BuLi/KFAS mole ratio | 10/1 |
| Temperature, °F. | 122 |
| Time, hours | 16 |

The results obtained are presented in Table V.

TABLE V

| | 1 | 2 | 3 | 4 | 5 | 6 |
|---|---|---|---|---|---|---|
| BuLi, mhm | 0.6 | 0.8 | 1.0 | 1.2 | 1.4 | 1.6 |
| KFAS, mhm | 0.06 | 0.08 | 0.1 | 0.12 | 0.14 | 0.16 |
| Conversion, percent | 97 | 98 | 99 | 99 | 99 | 99 |
| Mooney, ML-4 at 212° F | 99 | 24 | 10 | 6 | 5 | 5 |
| Inherent viscosity [1] | 2.14 | 1.48 | 1.23 | 1.09 | 1.03 | 0.94 |
| Polystyrene, Wt. percent [1] | 0 | | 0 | | 0 | |
| Microstructure, percent: [1] | | | | | | |
| Raw values— | | | | | | |
| Trans | 38.7 | | 39.8 | | 39.8 | |
| Vinyl | 6.6 | | 7.3 | | 8.1 | |
| Normalized— | | | | | | |
| Cis, by difference | 39.7 | | 37.2 | | 36.1 | |
| Trans | 51.5 | | 53.1 | | 53.1 | |
| Vinyl | 8.8 | | 9.7 | | 10.8 | |

[1] See appropriate footnotes to Table I.

These data show that completely random copolymers with a low vinyl content were obtained.

*Example V*

Another series of runs was carried out in which 1,3-butadiene and styrene were copolymerized with a catalyst prepared as described in Example IV. In these runs the mole ratio of n-butyllithium (BuLi) to potassium fatty acid soap (KFAS) was varied. The results of the runs are summarized in Table VI.

TABLE IV

| Run No. | $\phi$Na, mhm. | Effective BuLi/$\phi$Na, Mole Ratio | Inh.[1] Visc. | Polystyrene,[1] Wt. Percent | Microstructure, Percent [1] | | | | |
|---|---|---|---|---|---|---|---|---|---|
| | | | | | Raw | | Normalized | | |
| | | | | | Trans | Vinyl | Cis | Trans | Vinyl |
| 1 | 0.2 | 2/1 | 1.36 | 0 | 40.4 | 8.2 | 35.2 | 53.9 | 10.9 |
| 2 | 0.4 | 1/1 | 1.41 | 0 | 37.0 | 12.4 | 34.2 | 49.3 | 16.5 |
| 3 | 0.8 | 0.5/1 | 1.11 | 0 | 34.4 | 20.2 | 27.2 | 45.9 | 26.9 |

[1] See appropriate footnotes to Table I.

These data show that random butadiene/styrene copolymers with no detectable polystyrene can be obtained by carrying out the polymerizations with a catalyst which forms on mixing butyllithium and phenylsodium.

*Example IV*

A series of runs was made for the copolymerization of butadiene with styrene in the presence of a catalyst formed from butyllithium and potassium fatty acid soap (for purposes of calculation assumed to be potassium stearate). The catalyst was prepared by mixing the potassium fatty acid soap (KFAS) with a cyclohexane solution of n-butyllithium (BuLi). Variable quantities of the catalyst were used. An additional 0.6 millimole per 100 parts by weight of monomers was charged as a scavenger in each run. The following polymerization recipe was used:

| | |
|---|---:|
| 1,3-butadiene, parts by weight | 75 |
| Styrene, parts by weight | 25 |
| Cyclohexane, parts by weight | 940 |

TABLE VI

| | 1 | 2 | 3 | 4 | 5 | 6 |
|---|---|---|---|---|---|---|
| 1,3-butadiene, parts by weight | 75 | 75 | 75 | 75 | 75 | 75 |
| Styrene, parts by weight | 25 | 25 | 25 | 25 | 25 | 25 |
| Cyclohexane, parts by weight | 940 | 940 | 940 | | | |
| n-Hexane, parts by weight | | | | 800 | 800 | 800 |
| n-Butyllithium, mmoles | 0.8 | 0.8 | 0.8 | 0.8 | 0.8 | 0.8 |
| Potassium fatty acid soap, mmoles | 0.04 | 0.05 | 0.16 | 0.04 | 0.05 | 0.16 |
| Scavenger (BuLi), mmoles | 0.6 | 0.6 | 0.6 | 0.6 | 0.6 | 0.6 |
| BuLi/KFAS, mole ratio | 20/1 | 15/1 | 5/1 | 20/1 | 15/1 | 5/1 |
| Temperature, °F | 122 | 122 | 122 | 122 | 122 | 122 |
| Time, hours | 16 | 16 | 16 | 16 | 16 | 16 |
| Conversion, percent | 99 | 98 | 100 | 94 | 98 | 100 |
| Mooney, ML-4 at 212° F | 18 | 18 | 10 | 10 | 14 | 11 |
| Inherent viscosity [1] | 1.41 | 1.40 | 1.17 | 1.28 | 1.37 | 1.27 |
| Polystyrene, wt. percent [1] | 0 | 0 | 0 | 0 | 0 | 0 |
| Microstructure, percent: [1] | | | | | | |
| Raw values— | | | | | | |
| Trans | 39.0 | 38.4 | 37.0 | 43.7 | 41.7 | 39.7 |
| Vinyl | 7.0 | 7.4 | 10.8 | 7.5 | 7.8 | 9.7 |
| Normalized— | | | | | | |
| Cis, by difference | 38.7 | 38.9 | 36.3 | 31.8 | 34.0 | 34.2 |
| Trans | 52.0 | 51.2 | 49.3 | 58.2 | 55.6 | 52.9 |
| Vinyl | 9.3 | 9.9 | 14.4 | 10.0 | 10.4 | 12.9 |

[1] See appropriate footnotes to Table I.

The data in Table VI indicate that random copolymers were obtained in all the runs and that the vinyl content of the copolymer was low.

Example VI

A series of runs was conducted in which 1,3-butadiene and styrene were copolymerized in the presence of a catalyst formed by mixing n-butyllithium and potassium salts of (1) 2,6-di-tert-butyl-4-methylphenol (Ionol), (2) 2,2'-methylene - bis(4 - methyl - 6 - tert - butylphenol) (AO–2246) (3) di-n-butylamine, and (4) tert-dodecylmercaptan (Sulfole). The procedure followed in the runs was to charge the diluent cyclohexane first after which the monomers were added. The butyllithium was then added followed by one of the potassium salts. The potassium salts were prepared by adding excess potassium to each of the foregoing compounds at room temperature in an atmosphere of nitrogen. After a reaction period of 72 hours, unreacted potassium was removed and the products were slurried in a small amount of cyclohexane. The amount of materials employed and the results obtained in the runs are shown below in Table VII.

TABLE VII

|  | 1 | 2 | 3 | 4 |
|---|---|---|---|---|
| 1,3-butadiene, parts by wt | 75 | 75 | 75 | 75 |
| Styrene, parts by wt | 25 | 25 | 25 | 25 |
| Cyclohexane, parts by wt | 800 | 800 | 800 | 800 |
| n-Butyllithium, mmoles | 3.0 | 3.0 | 3.0 | 3.0 |
| Potassium salt, mmoles: |  |  |  |  |
| Ionol, K salt | 1.0 |  |  |  |
| AO–2246, K salt |  | 1.0 |  |  |
| Di-n-butylamine, K salt |  |  | 1.0 |  |
| tert-Dodecylmercaptan, K salt |  |  |  | 1.0 |
| Assumed scavenger (BuLi), mmoles | 0.5 | 0.5 | 0.5 | 0.5 |
| Effective BuLi level, mmoles | 2.5 | 2.5 | 2.5 | 2.5 |
| Effective BuLi/K salt, mole ratio | 2.5/1 | 2.5/1 | 2.5/1 | 2.5/1 |
| Temperature, °F | 122 | 122 | 122 | 122 |
| Time, hours | 7.5 | 7.5 | 7.5 | 7.5 |
| Conversion, percent | 99.8 | 79.5 | 100 | 100 |
| Inherent viscosity [1] |  |  | 0.77 | 0.78 |
| Polystyrene, wt. percent |  |  | 0 | 0 |
| Microstructure, percent normalized:[1] |  |  |  |  |
| Cis (by difference) |  |  | 36.9 | 32.4 |
| Trans |  |  | 51.8 | 45.8 |
| Vinyl |  |  | 11.3 | 21.8 |

[1] See appropriate footnotes to Table I.

Random copolymers were obtained in all of the runs described in Table VII.

Runs were also carried out in which potassium salts of myristic, lauric, palmitic, oleic, lineolic and ricinolic acids were used with n-butyllithium in forming the catalyst systems. These catalysts were then employed in runs similar to the above-described runs in preparing random copolymers of butadiene and styrene.

Example VII

A series of runs is conducted in which 1,3-butadiene is polymerized in the presence of different catalyst systems of this invention. The catalysts are formed according to the procedure described in Example IV, and variable quantities of the catalyst components are employed. The following organolithium compounds and organic compounds of sodium, potassium, rubidium and cesium are used in forming each of the catalyst systems:

(1) isopropyllithium and ethylpotassium,
(2) sec-butyllithium and n-propylrubidium,
(3) phenyllithium and the cesium salt of isopropyl alcohol,
(4) cyclohexyllithium and the sodium salt of allyl alcohol,
(5) 1,4-dilithiobutadiene and the potassium salt of 2-pentanethiol,
(6) naphthyllithium and the rubidium salt of stearic acid,
(7) 1,3,5-trilithiopentane and the cesium salt of oleic acid,
(8) tert-octyllithium and the sodium salt of n-hexylcarbonic acid,
(9) p-tolyllithium and the sodium salt of dimethylamine, and
(10) 4-phenylbutyllithium and the potassium salt of diphenylamine.

A rubbery polymer of butadiene is obtained in each of the runs. By varying the amount of the organic compounds of sodium, potassium, rubidium or cesium used, it is possible to control the vinyl content of the polymer.

The above-described runs are repeated using a 50/50 weight mixture of isoprene and styrene. The products obtained in these runs are completely random copolymers having a low vinyl content.

As will be evident to those skilled in the art, many variations and modifications can be practiced upon consideration of the foregoing disclosure. Such variations and modifications are clearly believed to be within the spirit and scope of the invention.

I claim:

1. A process for preparing conjugated diene polymers which comprises contacting in a polymerization zone a monomeric material selected from the group consisting of (1) at least one conjugated diene containing from 4 to 12 carbon atoms per molcule and (2) a mixture of a conjugated diene containing from 4 to 12 carbon atoms per molecule and a vinyl-substituted aromatic hydrocarbon in which said vinyl group is attached to a nuclear carbon atom with a catalyst which forms on mixing materials consisting essentially of (a) an organolithium compound having the formula $R(Li)_x$, wherein R is a hydrocarbon radical selected from the group consisting of aliphatic, cycloaliphatic and aromatic radicals containing from 1 to 20 carbon atoms and $x$ is an integer from 1 to 4, inclusive, and (b) an organic compound selected from the group consisting of compounds having the following formulas:

(1) $R'(YM)_n$ (2) 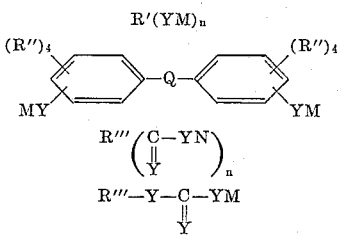

(3) 

(4) $R'''—Y—\underset{\underset{Y}{\|}}{C}—YM$ and (5) $\begin{matrix} R' \\ \phantom{R'}\diagdown \\ \phantom{RR'}N—M \\ \phantom{R'}\diagup \\ R' \end{matrix}$ wherein R' is selected from the group consisting of aliphatic, cycloaliphatic and aromatic radicals containing from 1 to 20 carbon atoms, M is an alkali metal selected from the group consisting of sodium, potassium, rubidium and cesium, R'' is selected from the group consisting of hydrogen, and aliphatic, cycloaliphatic and aromatic radicals containing from 1 to 6 carbon atoms, Q is selected from the group consisting of

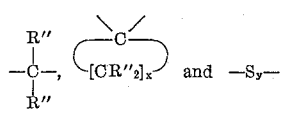

radicals where R' is as defined before, $x$ is an integer from 4 to 5, inclusive, and $y$ is an integer from 1 to 3, inclusive, R''' is selected from the group consisting of aliphatic, cycloaliphatic and aromatic radicals containing from 4 to 20 carbon atoms, Y is selected from the group consisting of oxygen and sulfur, and $n$ is an integer from 1 to 3, inclusive, said organolithium compound is in the range of 0.3 to 100 milliequivalents of organolithium compound per 100 parts by weight of monomeric material, and the relative quantities of said organolithium compound and said organic compound is in the range of 0.25 to 25 equivalents of organolithium compound (based on lithium atoms) per equivalent of organic compound, said contacting occurring at a temperature in the range of −80 to 150° C. and in the presence of a hydrocarbon diluent; and recovering a conjugated diene polymer.

2. A process according to claim 1 in which said monomeric material is 1,3-butadiene.

3. A process according to claim 1 in which said monomeric material is isoprene.

4. A process according to claim 1 in which said monomeric material is a mixture of 1,3-butadiene and styrene.

5. A process according to claim 1 in which said monomeric material is a mixture of isoprene and styrene.

6. A process according to claim 1 in which said monomeric material is a mixture of 1,3-butadiene and 3-methylstyrene.

7. A process according to claim 1 in which the amount of said organolithium compound is in the range of 0.6 to 15 milliequivalents of organolithium compound per 100 parts by weight of monomeric material, and the relative quantities of said organolithium compound and said organic compound is in the range of 0.25 to 25 equivalents of organolithium compound (based on lithium atoms) per equivalent of organic compound and said contacting occurs at a temperature in the range of −20 to 80° C.

8. A process according to claim 1 in which said catalyst is one which forms on mixing materials consisting essentially of n-butyllithium and potassium tert-butoxide.

9. A process according to claim 1 in which said catalyst is one which forms on mixing materials consisting essentially of n-butyllithium and potassium salt of stearic acid.

10. A process according to claim 1 in which said catalyst is one which forms on mixing materials consisting essentially of n-butyllithium and potassium salt of di-n-butylamine.

11. A process according to claim 1 in which said catalyst is one which forms on mixing materials consisting essentially of n-butyllithium and potassium salt of 2,6-di-tert-butyl-4-methylphenol.

12. A process according to claim 1 in which said catalyst is one which forms on mixing materials consisting essentially of n-butyllithium and potassium salt of 2,2'-methylene-bis(4-methyl-6-tert-butylphenol).

13. A process according to claim 1 in which said catalyst is one which forms on mixing materials consisting essentially of n-butyllithium and a potassium salt of tert-dodecylmercaptan.

14. A catalyst for the polymerization of conjugated dienes consisting essentially of (a) an organolithium compound having the formula $R(Li)_x$, wherein R is a hydrocarbon radical selected from the group consisting of aliphatic, cycloaliphatic and aromatic radicals containing from 1 to 20 carbon atoms and $x$ is an integer from 1 to 4, inclusive, and (b) an organic compound selected from the group consisting of compounds having the following formulas:

(1) $R'(YM)_n$ (2) 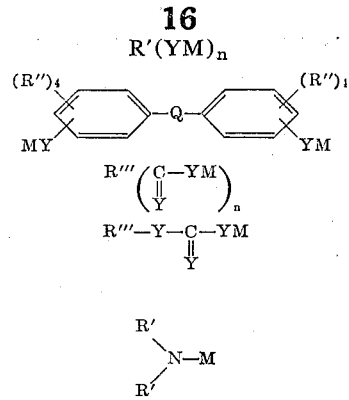

(3) $R'''\left(\overset{\overset{\displaystyle C-YM}{\|}}{Y}\right)_n$ (4) $R'''-Y-\underset{\|}{\overset{\|}{C}}-YM$ and (5) $\begin{matrix} R' \\ \phantom{R}\diagdown \\ \phantom{RR}N-M \\ \phantom{R}\diagup \\ R' \end{matrix}$ wherein R' is selected from the group consisting of aliphatic, cycloaliphatic and aromatic radicals containing from 1 to 20 carbon atoms, M is an alkali metal selected from the group consisting of sodium, potassium, rubidium and cesium, R'' is selected from the group consisting of hydrogen, and aliphatic, cycloaliphatic and aromatic radicals containing from 1 to 6 carbon atoms, Q is selected from the group consisting of

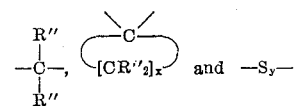

radicals where R' is as defined before, $x$ is an integer from 4 to 5, inclusive, and $y$ is an integer from 1 to 3, inclusive, R''' is selected from the group consisting of aliphatic, cycloaliphatic and aromatic radicals containing from 4 to 20 carbon atoms, Y is selected from the group consisting of oxygen and sulfur, and $n$ is an integer from 1 to 3, inclusive, and the relative quantities of said organolithium compound and said organic compound is in the range of 0.25 to 25 equivalents of organolithium compound (based on lithium atoms) per equivalent of organic compound.

15. A catalyst according to claim 14 wherein said organolithium compound is n-butyllithium and said organic compound is potassium tert-butoxide.

References Cited by the Examiner

UNITED STATES PATENTS

| | | | |
|---|---|---|---|
| 2,849,432 | 8/1958 | Kibler et al. | 260—94.2 |
| 3,049,528 | 8/1962 | Diem | 260—94.2 |
| 3,122,592 | 2/1964 | Eberly | 260—665 |
| 3,177,190 | 4/1965 | Hsieh | 260—94.2 |
| 3,208,988 | 9/1965 | Forman et al. | 260—94.2 |

FOREIGN PATENTS

| | | |
|---|---|---|
| 817,695 | 8/1959 | Great Britain. |

JOSEPH L. SCHOFER, *Primary Examiner.*

JAMES A. SEIDLECK, *Examiner.*